United States Patent
Kaminade et al.

(10) Patent No.: US 11,511,765 B2
(45) Date of Patent: Nov. 29, 2022

(54) VEHICLE CONTROL APPARATUS AND METHOD

(71) Applicant: TOYOTA JIDOSHA KABUSHIKI KAISHA, Toyota (JP)

(72) Inventors: Takuya Kaminade, Okazaki (JP); Takashi Unigame, Kasugai (JP); Masashi Oishi, Owariasahi (JP); Yuhi Kishimoto, Toyota (JP); Yoichi Iwata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 16/884,282

(22) Filed: May 27, 2020

(65) Prior Publication Data

US 2021/0039665 A1 Feb. 11, 2021

(30) Foreign Application Priority Data

Aug. 9, 2019 (JP) .............................. JP2019-147173

(51) Int. Cl.
*B60W 50/10* (2012.01)
*B60W 40/08* (2012.01)

(52) U.S. Cl.
CPC ............ *B60W 50/10* (2013.01); *B60W 40/08* (2013.01); *B60W 2540/10* (2013.01); *B60W 2540/12* (2013.01); *B60W 2540/20* (2013.01)

(58) Field of Classification Search
CPC .. B60W 50/10; B60W 40/08; B60W 2540/10; B60W 2540/12; B60W 2540/20; B60W 30/18118; Y02T 10/40
See application file for complete search history.

(56) References Cited

U.S. PATENT DOCUMENTS

2012/0004820 A1* 1/2012 Gatti .................. B60W 10/184
701/99

FOREIGN PATENT DOCUMENTS

| JP | 2011173586 A | * | 9/2011 |
| JP | 2012107602 A | * | 6/2012 |
| JP | 2012107602 A | | 6/2012 |
| JP | 2018005808 A | | 1/2018 |
| JP | 2018131069 A | | 8/2018 |
| JP | 2018193911 A | | 12/2018 |

OTHER PUBLICATIONS

Machine Translation of JP-2012107602-A (Year: 2012).*
Machine Translation of JP-2011173586-A (Year: 2011).*

* cited by examiner

*Primary Examiner* — Faris S Almatrahi
*Assistant Examiner* — Andrew J Cromer
(74) *Attorney, Agent, or Firm* — Dickinson Wright, PLLC

(57) ABSTRACT

Provided is a control apparatus for a vehicle configured to execute driving force suppression control when a predetermined erroneous operation condition is satisfied, the erroneous operation condition being satisfied when a first condition including at least an operation velocity condition is satisfied and a second condition is satisfied, the operation velocity condition being satisfied when an operation velocity which is an amount of change in an operation amount of an accelerator operation element per unit time is equal to or higher than an operation velocity threshold, and the second condition being satisfied when the operation amount becomes equal to or larger than a first operation amount threshold within a first time threshold from a time point at which the first condition is satisfied.

9 Claims, 9 Drawing Sheets

VEHICLE CONTROL APPARATUS AND METHOD

CROSS-REFERENCES TO RELATED APPLICATION

The present application claims priority to Japanese patent application No. JP 2019-147173 filed on Aug. 9, 2019, the content of which is hereby incorporated by reference in its entirety.

BACKGROUND

1. Technical Field

The present disclosure relates to a vehicle control apparatus and method for controlling a travel state of a vehicle when determining that an accelerator operation element is erroneously operated.

2. Description of the Related Art

Hitherto, there has been known a vehicle control apparatus (hereinafter referred to as a "related-art apparatus") configured to, when an operation amount of an accelerator operation element (accelerator pedal) is rapidly increased, determine that a driver of a vehicle is erroneously/mistakenly operating the accelerator operation element instead of a brake operation element (brake pedal). Hereinafter, such an operation is referred to as an "erroneous operation of the accelerator operation element (accelerator pedal)" or a "mistake operation of the accelerator operation element (accelerator pedal)".

When the related-art apparatus determines that the erroneous operation of the accelerator operation element is performed, the related-art apparatus controls a travel state of the vehicle such that an actual acceleration of the vehicle does not exceed an upper acceleration limit (see Japanese Patent Application Laid-open No. 2018-131069). Such control is referred to as "driving force suppression control" for the sake of convenience.

However, even in a case where the driver intentionally operates the accelerator operation element, there arises a situation in which the operation amount of the accelerator operation element is rapidly increased. Examples of such a situation include a situation in which the vehicle starts on a slope, and a situation in which the vehicle overtakes a preceding vehicle. Even in the above-mentioned examples, the related-art apparatus may determine that the erroneous operation of the accelerator operation element is performed, and thus execute the driving force suppression control. Therefore, there may arise a situation in which the vehicle is not accelerated even though the erroneous operation of the acceleration operation element is not actually performed.

SUMMARY

The present disclosure provides a technique capable of determining whether or not the erroneous operation of the accelerator operation element is performed with higher accuracy than that of the related-art apparatus, to thereby execute the driving force suppression control at an appropriate timing.

In one or more embodiments, there is provided a control apparatus for a vehicle, including: an accelerator operation element configured to be operated by a driver of the vehicle to accelerate the vehicle; a sensor configured to acquire information on at least an operation amount of the accelerator operation element; and a controller configured to determine whether or not a predetermined erroneous operation condition is satisfied based on the information acquired by the sensor, and execute, when determining that the erroneous operation condition is satisfied, driving force suppression control for controlling a driving force of the vehicle such that the driving force changed according to the operation amount of the accelerator operation element becomes smaller than the driving force of when the erroneous operation condition is not satisfied.

The inventors of the present application have obtained the following knowledge that, when the driver performs the erroneous operation of the accelerator operation element, after an operation velocity of the accelerator operation element is increased, the operation amount of the accelerator operation element reaches a predetermined value within a short period. On the other hand, when the driver intentionally operates the accelerator operation element, after the operation velocity is increased, it takes a longer period for the operation amount to reach the predetermined value compared with the case where the erroneous operation of the accelerator operation element is performed.

In view of the above, the controller is further configured to, when a first condition including at least an operation velocity condition is satisfied and a second condition is satisfied, determine that the erroneous operation condition is satisfied. The operation velocity condition is satisfied when an operation velocity which is an amount of change in the operation amount per unit time is equal to or higher than a predetermined positive operation velocity threshold. The second condition is satisfied when the operation amount becomes equal to or larger than a predetermined positive first operation amount threshold within a predetermined first time threshold from a time point at which the first condition is satisfied.

The control apparatus according to this configuration can distinguish between the erroneous operation of the accelerator operation element and the intentional operation of the accelerator operation element with higher accuracy than that of the related-art apparatus. Therefore, the control apparatus can determine the erroneous operation of the accelerator operation element with higher accuracy than that of the related-art apparatus, to thereby execute the driving force suppression control at an appropriate timing.

In one or more embodiments, the controller is configured to, when an operation amount condition is satisfied in addition to the operation velocity condition, determine that the first condition is satisfied. The operation amount condition is satisfied when the operation amount when the operation velocity condition is satisfied is equal to or larger than a predetermined positive second operation amount threshold which is smaller than the first operation amount threshold.

The inventors have obtained the following knowledge that, when the driver performs the erroneous operation of the accelerator operation element, even after the operation velocity is once increased, the operation velocity continues to be higher than a certain value. On the other hand, when the driver intentionally operates the accelerator operation element, the operation velocity is once increased, and then is slightly decreased. For example, the operation amount is rapidly increased to become equal to or higher than a predetermined value (second operation amount threshold), and then, the operation velocity tends to be slightly decreased. In view of this, the first condition in this configuration further includes the operation amount condition. When the operation velocity condition and the operation amount condition are satisfied, the controller determines that the first condition is satisfied. Accordingly, the control apparatus according to this configuration can distinguish between the erroneous operation of the accelerator operation element and the intentional operation of the accelerator operation element with higher accuracy than that of the related-art apparatus.

In one or more embodiments, the control apparatus further includes a decelerator operation element configured to be operated by the driver to decelerate the vehicle. The controller is configured to, when a third condition is satisfied in addition to the first condition and the second condition, determine that the erroneous operation condition is satisfied. The third condition is satisfied when an elapsed time since the driver releases an operation of the decelerator operation element is equal to or longer than a predetermined second time threshold.

When a "period during which the operation of the decelerator operation element has not been performed since the driver releases the operation of the decelerator operation element" is long, there is a possibility that the driver is not able to accurately distinguish between the accelerator operation element and the decelerator operation element. When the first condition and the second condition are satisfied in the above situation, there is a high possibility that the erroneous operation of the accelerator operation element has been performed. The controller according to this configuration can, through the use of the third condition, determine whether the erroneous operation of the accelerator operation element is performed, with higher accuracy than that of the related-art apparatus.

In one or more embodiments, the controller is configured to, when a fourth condition is satisfied in addition to the first condition and the second condition, determine that the erroneous operation condition is satisfied. The fourth condition is satisfied when a turn signal of the vehicle is in an off state.

When the driver operates the accelerator operation element strongly, and the turn signal is in an on state, this situation may be the following situation 1 or 2.

(Situation 1): The vehicle is rapidly accelerated to overtake a preceding vehicle.

(Situation 2): The vehicle is stopped temporarily before a curve, and then, is rapidly accelerated.

The operation of the accelerator operation element in the above situation 1 or 2 does not be the erroneous operation. On the other hand, when the first condition and the second condition are satisfied in a state in which the turn signal is in the off state, there is a high possibility that the erroneous operation of the accelerator operation element has been performed. The controller according to this configuration can, through the use of the fourth condition, determine whether the erroneous operation of the accelerator operation element is performed, with higher accuracy than that of the related-art apparatus.

In one or more embodiments, the controller is configured to, when a fifth condition is satisfied in addition to the first condition, the second condition and the fourth condition, determine that the erroneous operation condition is satisfied. The fifth condition is satisfied when an elapsed time since a state of the turn signal is changed from a first state to a second state is equal to or longer a predetermined third time threshold. The first state is a state in which the turn signal is in an on state, and the second state is a state in which the turn signal is in the off state.

Immediately after the state of the turn signal is changed from the first state to the second state, there is a high possibility that the vehicle is still overtaking a preceding vehicle or the vehicle is still traveling on a curve. In such a situation, the driver intentionally operates the accelerator operation element strongly. On the other hand, when the first condition and the second condition are satisfied in a situation in which a long time has elapsed since the state of the turn signal is changed from the first state to the second state, there is a high possibility that the erroneous operation of the accelerator operation element has been performed. The controller according to this configuration can, through the use of the fifth condition, determine whether the erroneous operation of the accelerator operation element is performed, with higher accuracy than that of the related-art apparatus.

In one or more embodiments, the controller is configured to, when a sixth condition is satisfied in addition to the first condition and the second condition, determine that the erroneous operation condition is satisfied. The sixth condition is satisfied when a speed of the vehicle is equal to or lower than a predetermined speed threshold.

The inventors have obtained the following knowledge that there is a high possibility that the erroneous operation of the accelerator operation element is performed in a situation in which the vehicle is traveling at a low speed. The controller according to this configuration can, through the use of the sixth condition, determine whether the erroneous operation of the accelerator operation element is performed, with higher accuracy than that of the related-art apparatus.

In one or more embodiments, the controller is configured to, when a seventh condition is satisfied in addition to the first condition and the second condition, determine that the erroneous operation condition is satisfied. The seventh condition is satisfied when a gradient of a road on which the vehicle travels is equal to or smaller than a predetermined gradient threshold.

When the first condition and the second condition are satisfied in a situation in which a road on which the vehicle is traveling is not a slope, there is a high possibility that the erroneous operation of the accelerator operation element has been performed. The controller according to this configuration can, through the use of the seventh condition, determine whether the erroneous operation of the accelerator operation element is performed, with higher accuracy than that of the related-art apparatus.

In one or more embodiments, the controller is configured to, when a termination condition is satisfied after the erroneous operation condition is satisfied, terminate the driving force suppression control. The termination condition is satisfied when the operation amount of the accelerator operation element is equal to or smaller than a predetermined third operation amount threshold which is smaller than the first operation amount threshold.

When the operation amount of the accelerator operation element is decreased to a certain value (third operation amount threshold), there is a high possibility that the erroneous operation of the accelerator operation element is eliminated. The controller according to this configuration can, in response to satisfaction of the termination condition, terminate the driving force suppression control at an appropriate timing.

In one or more embodiments, there is provided a control method for a vehicle including an accelerator operation element configured to be operated by a driver of the vehicle to accelerate the vehicle, and a sensor configured to acquire information on at least an operation amount of the accelerator operation element. The control method includes: determining whether or not a predetermined erroneous operation condition is satisfied based on the information acquired by the sensor; and when determining that the erroneous operation condition is satisfied, executing driving force suppression control for controlling a driving force of the vehicle such that the driving force changed according to the operation amount of the accelerator operation element becomes smaller than the driving force of when the erroneous operation condition is not satisfied. The determining includes determining that the erroneous operation condition is satisfied when a first condition including at least an operation velocity condition is satisfied and a second condition is satisfied. The operation velocity condition is satisfied when an operation velocity which is an amount of change in the operation amount per unit time is equal to or higher than a predetermined positive operation velocity threshold. The second condition is satisfied when the operation amount becomes equal to or larger than a predetermined positive first operation amount threshold within a predetermined first time threshold from a time point at which the first condition is satisfied.

According to the control method, it is possible to determine the erroneous operation of the accelerator operation element with higher accuracy than that of the related-art apparatus, to thereby execute the driving force suppression control at an appropriate timing.

According to one or more embodiments, the above-mentioned controller is implemented by a microprocessor programmed for performing one or more operations and/or functionality described herein. In addition, the controller may be implemented, in whole or in part, by specifically configured to hardware (e.g., by one or more application specific integrated circuits or ASIC(s)).

DESCRIPTION OF THE EMBODIMENTS

First Embodiment

Figure 1:
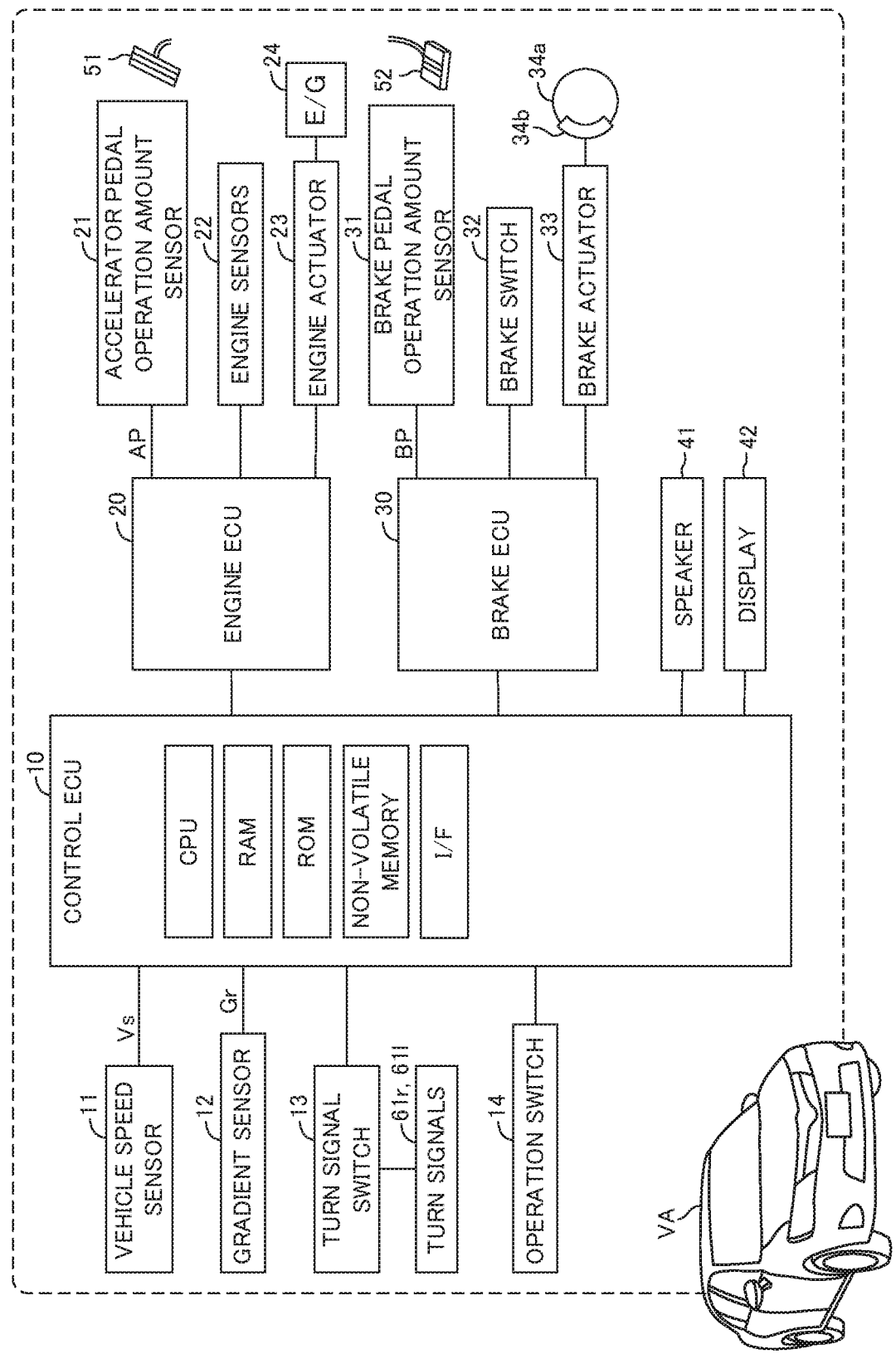
FIG. 1 is a schematic configuration diagram of a vehicle control apparatus (first apparatus) according to a first embodiment.

As illustrated in FIG. 1, a vehicle control apparatus (hereinafter referred to as a "first apparatus") according to a first embodiment of the present disclosure is applied to a vehicle VA.

(Configuration)

The first apparatus includes a control ECU 10, an engine ECU 20, and a brake ECU 30. Hereinafter, those ECUs are connected to each other such that information can be transmitted and received to and from each other via a controller area network (CAN) (not shown). In addition, two or more ECUs among the above-mentioned ECUs may be integrated into one ECU.

The ECU herein stands for "electric control unit", and is an electronic control circuit having a microcomputer as a main component. The microcomputer herein includes a CPU, a RAM, a ROM, a non-volatile memory, an interface I/F, and the like. The CPU executes instructions (programs and routines) stored in the ROM to realize various functions.

The control ECU 10 is connected to sensors and switches listed below, and is configured to receive detection signals or output signals from those sensors and switches.

A vehicle speed sensor 11 is configured to detect a travel speed (vehicle speed) of the vehicle VA, and output a signal indicative of a vehicle speed Vs.

A gradient sensor 12 includes, for example, a biaxial acceleration sensor. The biaxial acceleration sensor is configured to detect an acceleration in a vehicle longitudinal direction and an acceleration in a vehicle vertical direction, and output a signal indicative of a gradient Gr in the vehicle longitudinal direction of a road surface on which the vehicle is traveling. For example, the gradient sensor 12 detects the gradient Gr based on a ratio of the acceleration in the vehicle longitudinal direction and the acceleration in the vehicle vertical direction. When the vehicle VA travels on a horizontal plane, the gradient Gr becomes "0". In addition, the gradient Gr becomes a positive value (Gr>0) when the vehicle VA travels an upslope road, and becomes a negative value (Gr<0) when the vehicle VA travels a downslope road.

A turn signal switch 13 is a switch for changing each of left and right turn signals (direction indicators) 61*l* and 61*r* between an on state and an off state. A driver of the vehicle VA operates a turn signal lever (not shown) to operate (flash) each of the left and right turn signals 61*l* and 61*r*. The turn signal lever can be operated/rotated to at least a first position and a second position. The first position is a position rotated clockwise by a predetermined angle from an initial position. The second position is a position rotated counterclockwise by the predetermined angle from the initial position.

When the turn signal lever is positioned at the first position, the turn signal switch 13 causes the right turn signal 61*r* to be the on state (that is, causes the turn signal 61*r* to be flashed). In this case, the turn signal switch 13 outputs to the control ECU 10 a signal representing that the turn signal 61*r* is in the on state. When the turn signal lever is positioned at the second position, the turn signal switch 13 causes the left turn signal 61*l* to be the on state (that is, causes the turn signal 61*l* to be flashed). In this case, the turn signal switch 13 outputs to the control ECU 10 a signal representing that the turn signal 61*l* is in the on state. In addition, when both of the left and right turn signals 61*l* and 61*r* are in the off state, the turn signal switch 13 outputs to the control ECU 10 a signal representing such a state.

An operation switch 14 is a switch to be operated when the driver requests either permission or prohibition of execution of "driving force suppression control" described later. Each time the operation switch 14 is pressed, a state of the operation switch 14 alternates between an on state and an off state. When the operation switch 14 is in the on state, execution of the driving force suppression control is permitted. On the other hand, when the operation switch 14 is in the off state, execution of the driving force suppression control is prohibited.

The engine ECU 20 is connected to an accelerator pedal operation amount sensor 21 and engine sensors 22. The accelerator pedal operation amount sensor 21 is configured to detect an operation amount (accelerator opening degree [%]) of an accelerator pedal 51, and output a signal indicative of an accelerator pedal operation amount AP to the engine ECU 20. The accelerator pedal 51 is an accelerator operation element to be operated by the driver to accelerate the vehicle VA. When the driver does not operate the accelerator pedal 51 (that is, the driver does not depress the accelerator pedal 51), the accelerator pedal operation amount AP becomes "0". The greater the amount by which the driver depresses the accelerator pedal 51, the greater the accelerator pedal operation amount AP. The engine ECU 20 transmits a detection signal received from the accelerator pedal operation amount sensor 21 to the control ECU 10.

Each of the engine sensors 22 detects an operation state amount of a spark ignition, gasoline fuel injection engine 24. The engine sensors 22 include a throttle valve opening degree sensor, an engine rotation speed sensor, an intake air amount sensor, and the like.

Further, the engine ECU 20 is connected to an engine actuator 23. The engine actuator 23 includes a throttle valve actuator configured to change an opening degree of a throttle valve of the engine 24. The engine ECU 20 can drive the engine actuator 23 to change a torque generated by the engine 24. The torque generated by the engine 24 is transmitted to drive wheels via a transmission (not shown). Thus, the engine ECU 20 can control the engine actuator 23 to control a driving force of the vehicle VA, to thereby change an acceleration or acceleration state of the vehicle VA.

When the vehicle is a hybrid vehicle, the engine ECU 20 is capable of controlling a driving force of the vehicle to be generated by any one of or both of "an engine and a motor" serving as vehicle driving sources. Further, when the vehicle is an electric vehicle, the engine ECU 20 is capable of controlling a driving force of the vehicle to be generated by a motor serving as a vehicle driving source.

The brake ECU 30 is connected to a brake pedal operation amount sensor 31 and a brake switch 32. The brake pedal operation amount sensor 31 is configured to detect an operation amount of a brake pedal 52, and output a signal indicative of a brake pedal operation amount BP to the brake ECU 30. The brake pedal 52 is a brake operation element to be operated by the driver to decelerate the vehicle VA. When the driver does not operate the brake pedal 52 (that is, the driver does not depress the brake pedal 52), the brake pedal operation amount BP becomes "0". The greater the amount by which the driver depresses the brake pedal 52, the greater the brake pedal operation amount BP. The brake ECU 30 transmits the detection signal received from the brake pedal operation amount sensor 31 to the control ECU 10.

The brake switch 32 outputs an on signal to the brake ECU 30 when the driver operates the brake pedal 52, and outputs an off signal to the brake ECU 30 when the driver does not operate the brake pedal 52. The brake ECU 30 transmits the signal (on signal or off signal) received from the brake switch 32 to the control ECU 10.

Further, the brake ECU 30 is connected to a brake actuator 33. A braking force (braking torque) applied to each wheel is controlled by the brake actuator 33. The brake actuator 33 adjusts a hydraulic pressure to be supplied to a wheel cylinder integrated into a brake caliper 34*b* in accordance with an instruction from the brake ECU 30. With the wheel cylinder being operated by the hydraulic pressure, a brake pad is pressed against a brake disc 34*a* to generate a friction braking force. Thus, the brake ECU 30 can control the brake actuator 33 to control the braking force of the vehicle VA, to thereby change an acceleration state (a deceleration, namely, a negative acceleration) of the vehicle VA.

The control ECU 10 is connected to a speaker 41 and a display 42. The display 42 is a multi-information display arranged in front of a seat of the driver. The display 42 is configured to display various types of information in addition to display of measurement values such as the vehicle speed Vs and the engine rotation speed. A head-up display may be employed as the display 51.

The control ECU 10 causes the speaker 41 to utter an alert sound for alerting the driver while the driving force suppression control described later is executed. Further, the control ECU 10 displays on the display 42 a message that the accelerator pedal 51 is being depressed, and a mark/indicator (e.g., warning lamp) for alerting the driver.

(Determination of Erroneous Operation of Accelerator Pedal)

The inventors of the present application have obtained the following knowledge as a result of examining the past data of the erroneous operation of the accelerator pedal.

Figure 2:
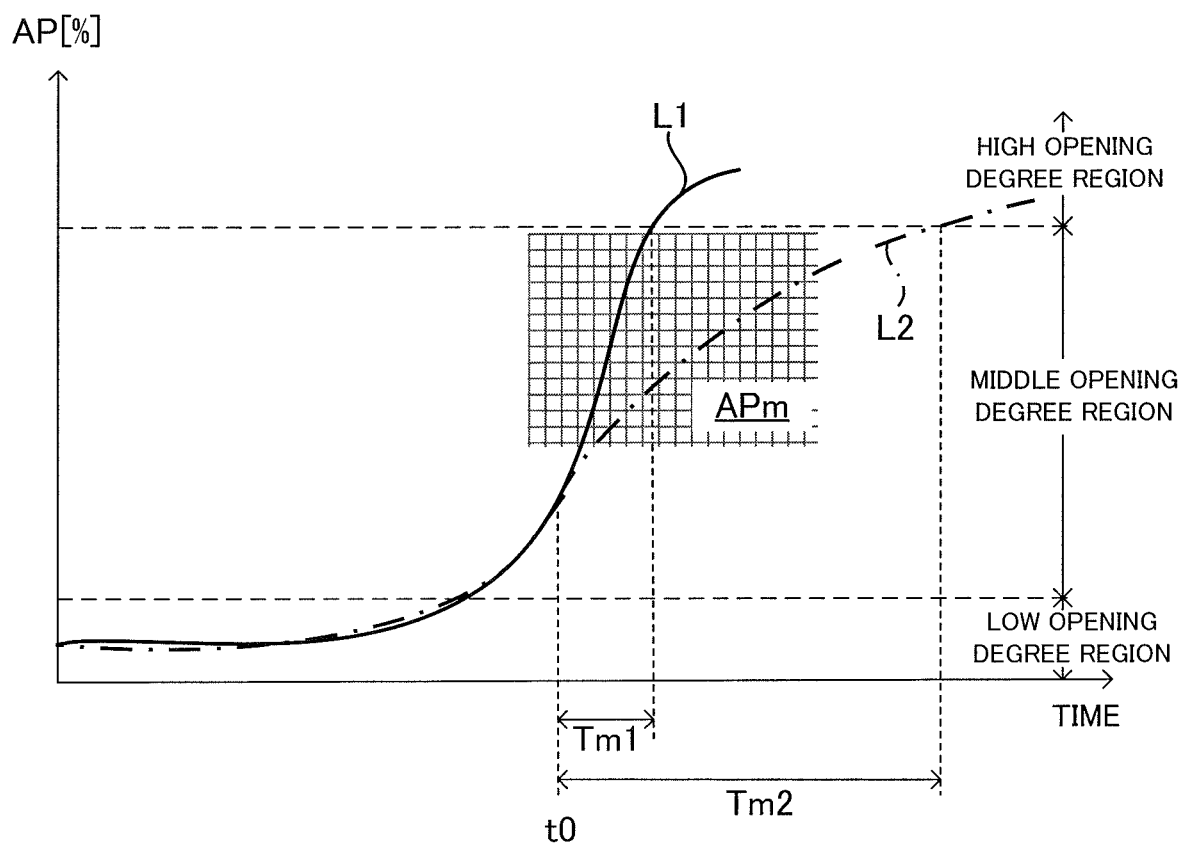
FIG. 2 is a graph including an example of a change with time of an accelerator pedal operation amount AP when a driver performs an erroneous operation of an accelerator pedal, and an example of a change with time of the accelerator pedal operation amount AP when the driver intentionally operates the accelerator pedal.

FIG. 2 illustrates an example of a change with time of the accelerator pedal operation amount AP (accelerator opening degree [%]) when a driver performs the erroneous operation of the accelerator pedal (see a solid line L1), and an example of a change with time of the accelerator pedal operation amount AP when the driver intentionally operates the accelerator pedal (see a dashed line L2). In FIG. 2, a low opening degree region is, for example, a region in which the accelerator opening degree is 0% or more and less than 20%, a middle opening degree region is, for example, a region in which the accelerator opening degree is 20% or more and less than 80%, and a high opening degree region is, for example, a region in which the accelerator opening degree is 80% or more. Hereinafter, an amount of change in the accelerator pedal operation amount AP per unit time is referred to as an "accelerator pedal operation velocity (or accelerator opening degree speed) APV [%/s]".

When the erroneous operation of the accelerator pedal is performed, the accelerator pedal operation velocity APV is high in the middle opening degree region. For example, at a time point t0, the accelerator pedal operation velocity APV becomes equal to or higher than an operation velocity threshold APVth which is a positive value. Further, when a relatively short time (Tm1) has elapsed from the time point t0, the accelerator pedal operation amount AP reaches the high opening degree region. This is because the driver falls into a panic state and the driver depresses the accelerator pedal 51 strongly.

On the other hand, in a situation in which the vehicle starts on an upslope road, or a situation in which the vehicle overtakes a preceding vehicle, the driver intentionally depresses the accelerator pedal 51 strongly. Even in a case where the driver intentionally operates the accelerator pedal 51 strongly, the accelerator pedal operation velocity APV is high in the middle opening degree region, and therefore, at the time point t0, the accelerator pedal operation velocity APV becomes equal to or higher than the operation velocity threshold APVth. However, after the time point t0, the accelerator pedal operation velocity APV is slightly decreased. This is because, in the above-mentioned situation, the driver tends to strongly depress the accelerator pedal at first, but depress the accelerator pedal relatively slowly thereafter. Therefore, when a relatively long time (Tm2>Tm1) has elapsed from the time point t0 at which the accelerator pedal operation speed APV becomes equal to or higher than the operation velocity threshold APVth, the accelerator pedal operation amount AP reaches the high opening degree region. In another example, after the time point t0, the accelerator pedal operation amount AP may not reach the high opening degree region.

In view of the above, the first apparatus determines whether or not the accelerator pedal operation amount AP becomes equal to or larger than a positive first operation amount threshold APth1 within a predetermined first time threshold Tath from the time point at which the accelerator pedal operation velocity APV becomes equal to or higher than the positive operation velocity threshold APVth. When such a condition is satisfied, the first apparatus determines that the erroneous operation of the accelerator pedal is performed.

Specifically, the control ECU 10 acquires the accelerator pedal operation amount AP (accelerator opening degree [%]) through the engine ECU 20 each time a predetermined time (hereinafter referred to as a "first time Tp1" for the sake of convenience) elapses. The control ECU 10 calculates and obtains the accelerator pedal operation velocity APV. More specifically, the control ECU 10 obtains a subtraction value dAP by subtracting the previously acquired accelerator pedal operation amount AP from the currently acquired accelerator pedal operation amount AP. Further, the control ECU 10 obtains the accelerator pedal operation velocity APV by dividing the subtraction value dAP by the first time (i.e., acquisition time interval Tp1 of the accelerator pedal operation amount AP) (APV=dAP/Tp1).

The control ECU 10 determines whether or not a first condition is satisfied. The first condition is satisfied when the following condition A1 is satisfied.

(Condition A1): The accelerator pedal operation velocity APV becomes equal to or higher than the operation velocity threshold APVth. In one or more embodiments, the operation velocity threshold APVth may be a value equal to or higher than 70[%/s]. In one or more embodiments, the operation velocity threshold APVth may be a value equal to or larger than 90[%/s]. Further, in one or more embodiments, the operation velocity threshold APVth may be a value equal to or larger than 100[%/s]. In the present example, the positive operation velocity threshold APVth is 100[%/s].

When the first condition is satisfied, the control ECU 10 starts measuring time with a timer T. The timer T is a timer for measuring an elapsed time Ta since at a time point at which the first condition is satisfied.

After the measurement by the timer T is started, the control ECU 10 determines whether or not a second condition is satisfied. The second condition is satisfied when both of the following conditions B1 and B2 are satisfied.

(Condition B1): The accelerator pedal operation amount AP becomes equal to or larger than the first operation amount threshold APth1. In one or more embodiments, the first operation amount threshold APth1 is a value equal to or larger than a lower limit value (for example, accelerator opening degree 80[%]) of the high opening degree region. In one or more embodiments, the first operation amount threshold APth1 may be a value equal to or larger than 90[%]. In the present example, the first operation amount threshold APth1 is 90[%].

(Condition B2): The elapsed time Ta at a time point at which the condition B1 is satisfied is equal to or shorter than the predetermined first time threshold Tath. In one or more embodiments, the first time threshold Tath is a value equal to or shorter than 0.5 s. In one or more embodiments, the first time threshold Tath may be a value equal to or shorter than 0.3 s. In the present example, the first time threshold Tath is 0.3 s.

When the first condition and the second condition are both satisfied, the control ECU 10 determines that the erroneous operation of the accelerator pedal 51 is performed by the driver. Hereinafter, the above-mentioned "first condition and second condition" are collectively referred to as an "erroneous operation condition". When the control ECU 10 determines that the erroneous operation condition is satisfied, the control ECU 10 starts the driving force suppression control, in place of normal driving force control which has been executed up to that determination time point.

(Normal Driving Force Control)

Figure 3:
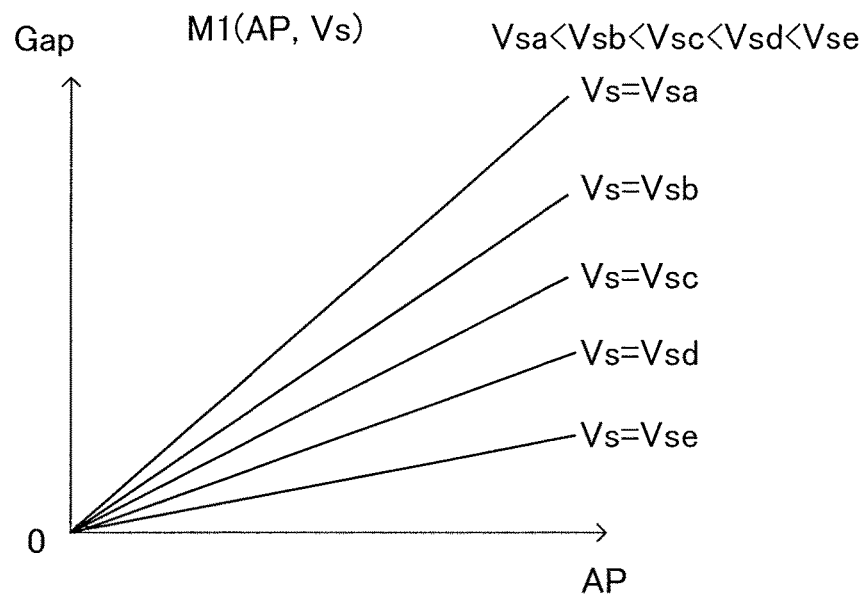
FIG. 3 is a diagram for illustrating a normal acceleration map M1 used for normal driving force control.

The control ECU 10 is configured to, when the erroneous operation condition is not satisfied, execute the normal driving force control. Specifically, each time the first time elapses, the control ECU 10 applies the accelerator pedal operation amount AP and the vehicle speed Vs to a normal acceleration map M1(AP, Vs) illustrated in FIG. 3 to obtain a "required acceleration Gap corresponding to the accelerator pedal operation amount AP and the vehicle speed Vs". In the normal acceleration map M1(AP, Vs), the required acceleration Gap is increased as the accelerator pedal operation amount AP is increased. Further, the required acceleration Gap is decreased as the vehicle speed Vs becomes higher.

The control ECU 10 sets a target acceleration Gtgt to the required acceleration Gap, and transmits the set target acceleration Gtgt to the engine ECU 20. The engine ECU 20 controls the engine actuator 23 such that an actual acceleration Ga matches (becomes equal to) the target acceleration Gtgt.

(Driving Force Suppression Control)

Figure 4:
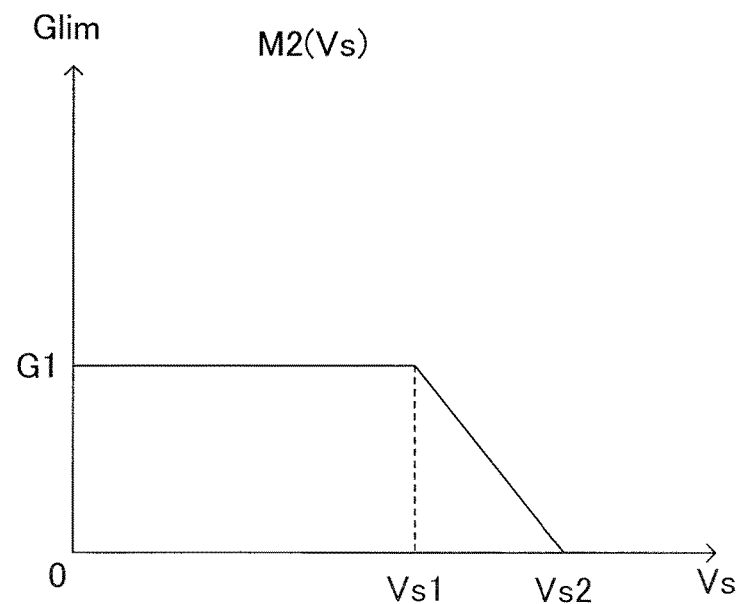
FIG. 4 is a diagram for illustrating a limited acceleration map M2 used for driving force suppression control.

The control ECU 10 is configured to, when the erroneous operation condition is satisfied, execute the driving force suppression control. Specifically, each time the first time elapses, the control ECU 10 obtains the required acceleration Gap through the use of the normal acceleration map M1 (AP, Vs) in the same manner as the above-mentioned normal driving force control. Further, when the erroneous operation condition is satisfied, each time the first time elapses, the control ECU 10 applies the vehicle speed Vs to a limited acceleration map M2(Vs) illustrated in FIG. 4 to obtain an "upper limit acceleration Glim corresponding to the vehicle speed Vs". In the limited acceleration map M2(Vs), when the vehicle speed Vs is a value from "0" to "Vs1", the upper limit acceleration Glim becomes a constant acceleration G1. Furthermore, the upper limit acceleration Glim is decreased as the vehicle speed Vs is increased from "Vs1". In addition, when the vehicle speed Vs is equal to or higher than "Vs2 (>Vs1)", the upper limit acceleration Glim becomes "0".

The control ECU 10 sets the smaller of the required acceleration Gap and the upper limit acceleration Glim as the target acceleration Gtgt each time the first time elapses.

The control ECU 10 transmits the set target acceleration Gtgt to the engine ECU 20. The engine ECU 20 controls the engine actuator 23 such that the actual acceleration Ga matches (becomes equal to) the target acceleration Gtgt.

In the above manner, the first apparatus executes the driving force suppression control to thereby limit the target acceleration Gtgt to a value equal to or lower than the "upper limit acceleration Glim corresponding to the vehicle speed Vs". Therefore, when the driver performs the erroneous operation of the accelerator pedal 51, the first apparatus can control the driving force of the vehicle VA such that the actual acceleration Ga does not exceed the upper limit acceleration Glim. In other words, when the first apparatus determines that the erroneous operation condition is satisfied, the first apparatus controls the driving force of the vehicle VA such that the driving force (the value corresponding to the actual acceleration) of the vehicle VA changed according to the accelerator pedal operation amount AP is smaller than that of when the erroneous operation condition is not satisfied (that is, when executing the normal driving force control).

(Termination of Driving Force Suppression Control)

The control ECU 10 determines whether or not a predetermined termination condition is satisfied on and after at the time point at which the driving force suppression control is started (that is, the erroneous operation condition is satisfied). The termination condition is satisfied when the erroneous operation of the accelerator pedal 51 is eliminated (cancelled). Specifically, the termination condition is satisfied when the accelerator pedal operation amount AP becomes equal to or smaller than a predetermined termination threshold APeth. The termination threshold APeth is a value at which the accelerator pedal operation amount AP reaches when the driver weakens the operation on the accelerator pedal 51 (including when the driver releases his/her foot from the accelerator pedal). In one or more embodiments, the termination threshold APeth may be, for example, a value in the low opening degree region (for example, the accelerator opening degree is 0 or more and less than 20[%]). In the present example, the termination threshold APeth is 10[%].

Operation Example

An example of operations of the first apparatus when the erroneous operation of the accelerator pedal 51 is performed will be described with reference to FIG. 5.

<Time Point t1>

Figure 5:
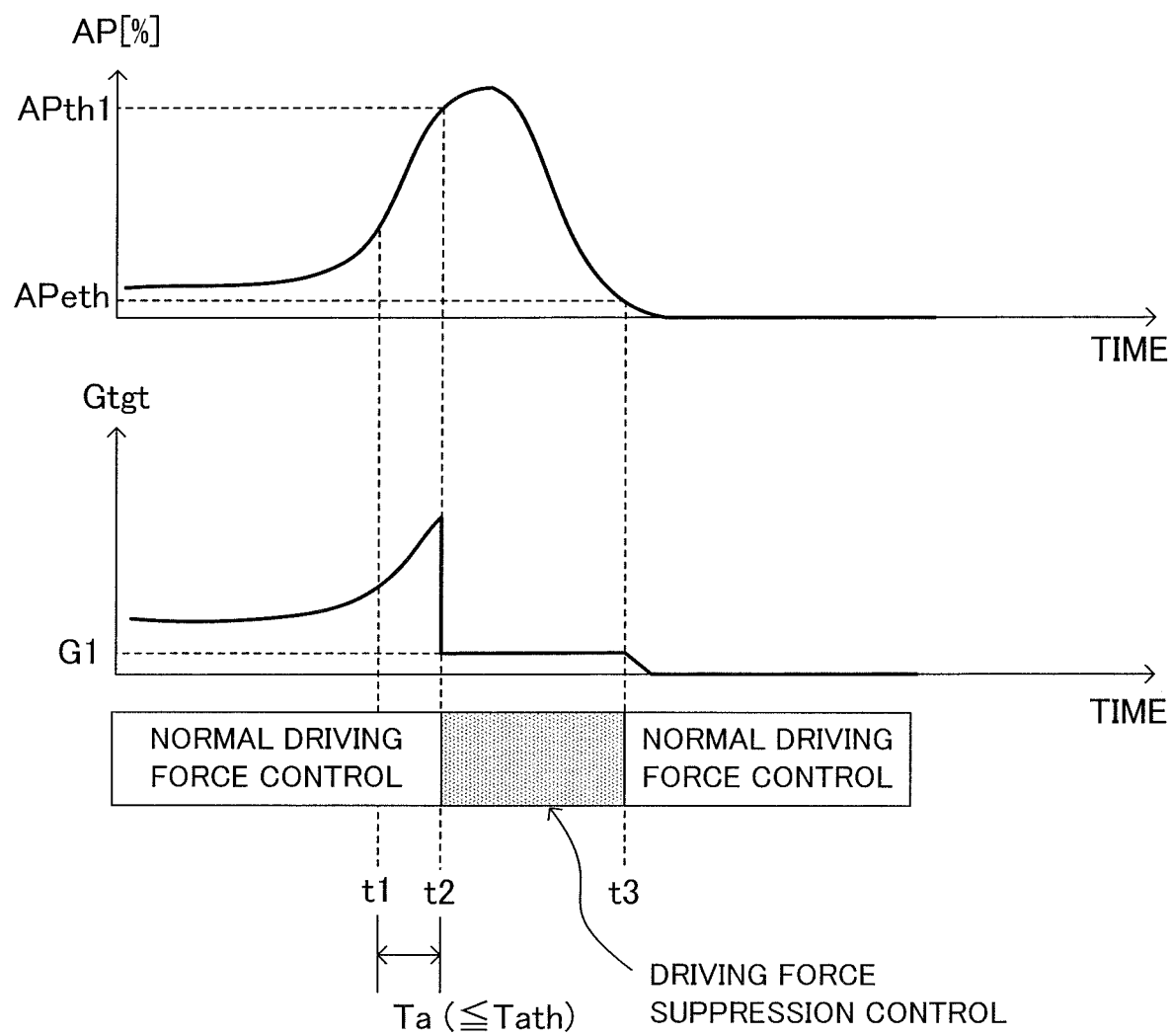
FIG. 5 is a timing chart for explaining processing of the first apparatus when the erroneous operation of the accelerator pedal is performed.

At a time point t1 in the example illustrated in FIG. 5, the accelerator pedal operation velocity APV becomes equal to or higher than the operation velocity threshold APVth. Thus, the control ECU 10 performs the following operations 1 and 2.

(Operation 1): The control ECU 10 determines that the first condition is satisfied.

(Operation 2): The control ECU 10 starts measuring time by using the timer T. That is, the control ECU 10 measures the elapsed time Ta since the first condition is satisfied (the present time point t1).

At the time point t1, only the first condition is satisfied among the first condition and the second condition. That is, the erroneous operation condition has not yet been satisfied. Thus, the control ECU 10 continues executing the normal driving force control.

<Time Point t2>

At a time point t2 in FIG. 5, the accelerator pedal operation amount AP becomes equal to or larger than the first operation amount threshold APth1. Thus, the control ECU 10 performs the following operations 3 to 6.

(Operation 3): The control ECU 10 determines that the condition B1 is satisfied.

(Operation 4): Since the elapsed time Ta at the time point at which the condition B1 is satisfied is equal to or shorter than the first time threshold Tath, the control ECU 10 determines that the condition B2 is satisfied.

(Operation 5): The conditions B1 and B2 are satisfied, and therefore, the second condition is satisfied. Thus, the control ECU 10 determines that the erroneous operation condition is satisfied. The control ECU 10 starts the driving force suppression control.

(Operation 6): The control ECU 10 executes a predetermined alerting processing for the driver. Specifically, the control ECU 10 causes the speaker 41 to utter the "alert sound for alerting the driver". Further, the control ECU 10 displays on the display 42 the message that the accelerator pedal 51 is being depressed, and the mark for alerting the driver.

Generally, the erroneous operation of the accelerator pedal 51 is performed in a situation in which the vehicle speed Vs is low. In the example of FIG. 5, the vehicle speed Vs is lower than Vs1 at the time point t2. The control ECU 10 uses the normal acceleration map M1(AP, Vs) to obtain the required acceleration Gap. Since the vehicle speed Vs is low and the accelerator pedal operation amount AP is large, the required acceleration Gap becomes larger. Further, the control ECU 10 uses the limited acceleration map M2(Vs) to obtain the upper limit acceleration Glim. In this case, the upper limit acceleration Glim is "G1", and is considerably smaller than the required acceleration Gap. Thus, the control ECU 10 sets the target acceleration Gtgt to the upper limit acceleration Glim, and transmits the target acceleration Gtgt to the engine ECU 20. As a result, the travel state of the vehicle VA is controlled such that the actual acceleration Ga does not exceed the upper limit acceleration G1. Therefore, rapid acceleration of the vehicle VA is avoided.

<Time Point t3>

In the example of FIG. 5, at a time point between the time points t2 and t3, the driver weakens the operation on the accelerator pedal 51 in response to the alert processing. Thereafter, at the time point t3, the accelerator pedal operation amount AP becomes equal to or smaller than the termination threshold APeth, and therefore, the termination condition is satisfied. The control ECU 10 terminates the driving force suppression control, and restarts the normal driving force control.

(Operation)

The CPU (hereinafter simply referred to as "CPU") of the control ECU 10 is configured to, each time a predetermined time (for example, the first time) elapses, execute routines illustrated in FIGS. 6 to 8.

The CPU receives detection signals and output signals from the sensors (11, 12, 21, 22 and 31) and the switches (13, 14 and 32) each time the first time elapses, and stores those detection signals and output signals in the RAM.

Figure 6:
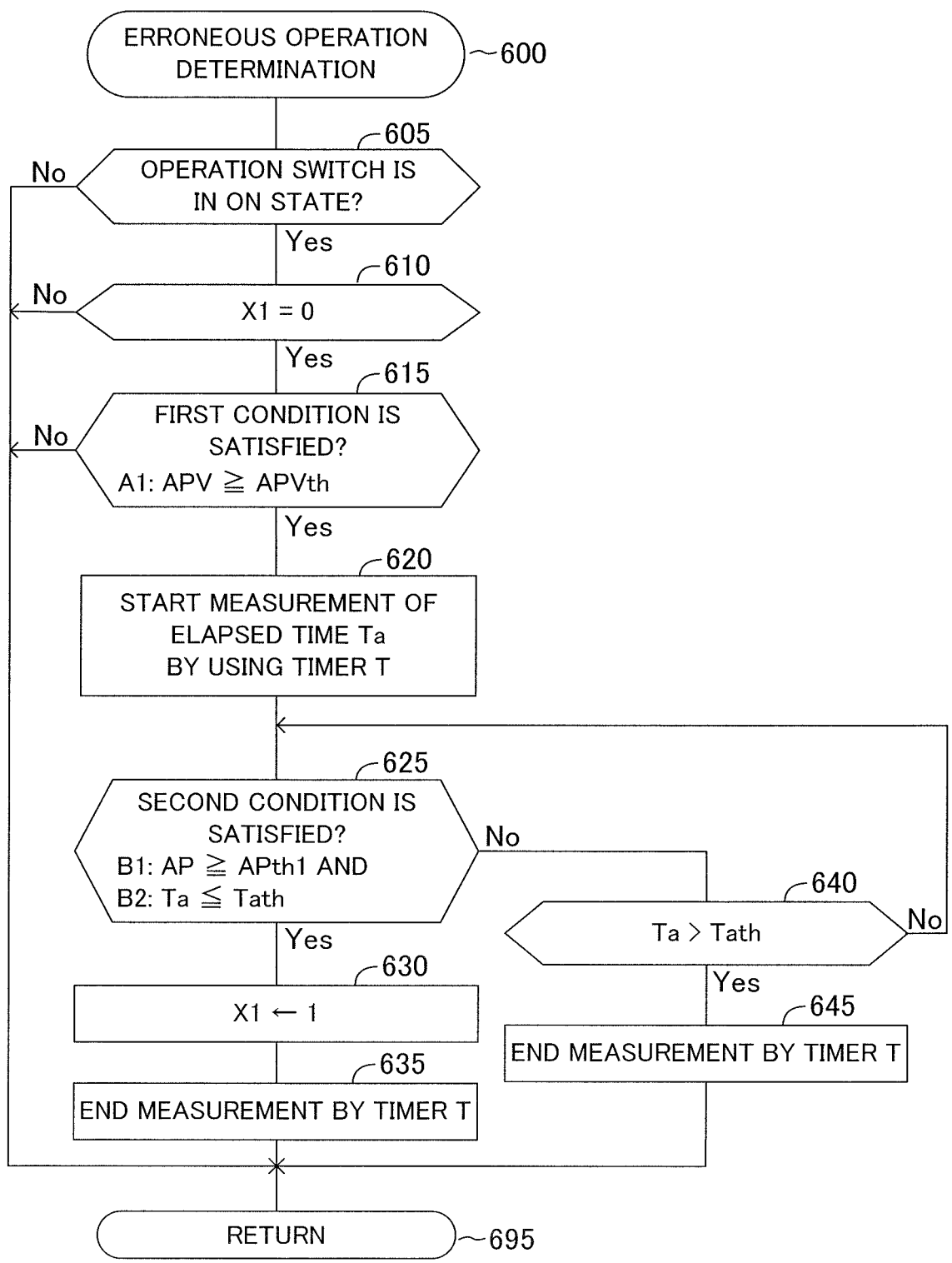
FIG. 6 is a flowchart for illustrating an "erroneous operation determination routine" to be executed by a CPU of a control ECU in the first apparatus.

When a predetermined timing is reached, the CPU starts the processing from Step 600 of FIG. 6, and proceeds to Step 605 to determine whether or not the operation switch 14 is in the on state. When the operation switch is not in the on state, the CPU makes a "No" determination in Step 605, and proceeds directly to Step 695 to temporarily finish this routine.

It is assumed that the operation switch 14 is in the on state. In this case, the CPU makes a "Yes" determination in Step 605, and proceeds to Step 610 to determine whether or not a value of a suppression control execution flag (hereinafter simply referred to as an "execution flag") X1 is "0". When the value of the execution flag X1 is "0", this indicates that the driving force suppression control is not being executed. When the value of the execution flag X1 is "1", this indicates that the driving force suppression control is being executed. The value of the execution flag X1 is set to "0" in an initialization routine to be executed by the CPU when an ignition switch (not shown) is changed from an off state to an on state.

When the value of the execution flag X1 is not "0", the CPU makes a "No" determination in Step 610, and proceeds directly to Step 695 to temporarily finish this routine.

When it is assumed that the value of the execution flag X1 is "0", the CPU makes a "Yes" determination in Step 610, and proceeds to Step 615 to determine whether or not the above-mentioned first condition is satisfied. When the first condition is not satisfied, the CPU makes a "No" determination in Step 615, and proceeds directly to Step 695 to temporarily finish this routine.

Meanwhile, when the first condition is satisfied, the CPU makes a "Yes" determination in Step 615, and proceeds to Step 620. In Step 620, the CPU first resets/initializes the timer T. Then, the CPU starts measuring the elapsed time Ta by using the timer T. Next, in Step 625, the CPU determines whether or not the above-mentioned second condition is satisfied.

When the second condition is satisfied, the CPU makes a "Yes" determination in Step 625, and executes the processing of Steps 630 and 635 (described below) in sequence. Thereafter, the CPU proceeds to Step 695 to temporarily finish this routine.

Step 630: The CPU sets the value of the execution flag X1 to "1".

Step 635: The CPU ends the measurement by the timer T.

Meanwhile, when the second condition is not satisfied, the CPU makes a "No" determination in Step 625, and proceeds to Step 640 to determine whether or not the elapsed time Ta is longer than the first time threshold Tath. When the elapsed time Ta is equal to or shorter than the first time threshold Tath, the CPU makes a "No" determination in Step 640, and returns to Step 625 to determine whether or not the second condition is satisfied. In addition, while the CPU repeatedly executes the processing of Steps 625 and 640 in this manner, the CPU continues acquiring the latest information on the accelerator pedal operation amount AP from the accelerator pedal operation amount sensor 21.

It is assumed that, after the measurement of the elapsed time Ta by the timer T is started, the elapsed time Ta becomes longer than the first time threshold Tath without the second condition being satisfied. In this case, the CPU makes a "Yes" determination in Step 640, and proceeds to Step 645 to end the measurement by the timer T. Thereafter, the CPU proceeds to Step 695 to temporarily finish this routine.

Figure 7:
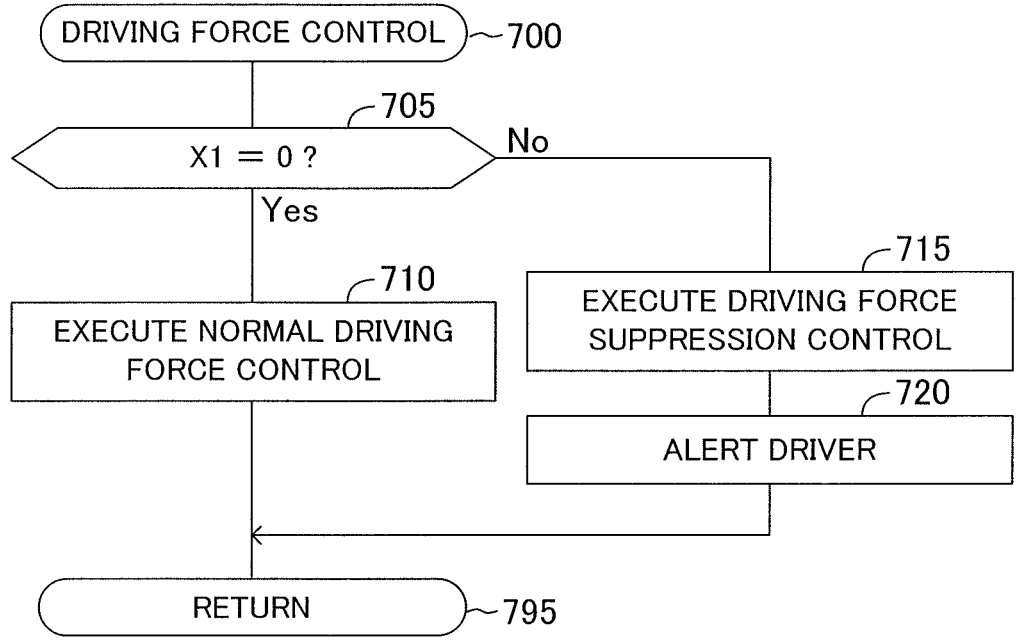
FIG. 7 is a flowchart for illustrating a "driving force control routine" to be executed by the CPU of the control ECU in the first apparatus.

Further, when a predetermined timing is reached, the CPU starts the processing from Step 700 of FIG. 7, and proceeds to Step 705 to determine whether or not the value of the execution flag X1 is "0". When the value of the execution flag X1 is "0", the CPU makes a "Yes" determination in Step 705, and proceeds to Step 710. In Step 710, the CPU executes the normal driving force control as described above. Thereafter, the CPU proceeds to Step 795 to temporarily finish this routine.

Meanwhile, when the value of the execution flag X1 is not "0" (that is, the execution flag X1 is "1"), the CPU makes a "No" determination in Step 705, and executes the processing of Steps 715 and 720 (described below) in sequence. Thereafter, the CPU proceeds to Step 795 to temporarily finish this routine.

Step 715: The CPU executes the driving force suppression control as described above.

Step 720: The CPU executes the alerting processing for the driver. Specifically, the control ECU 10 causes the speaker 41 to utter the alert sound, and displays on the display 42 the above-mentioned message and mark for alerting the driver.

Figure 8:
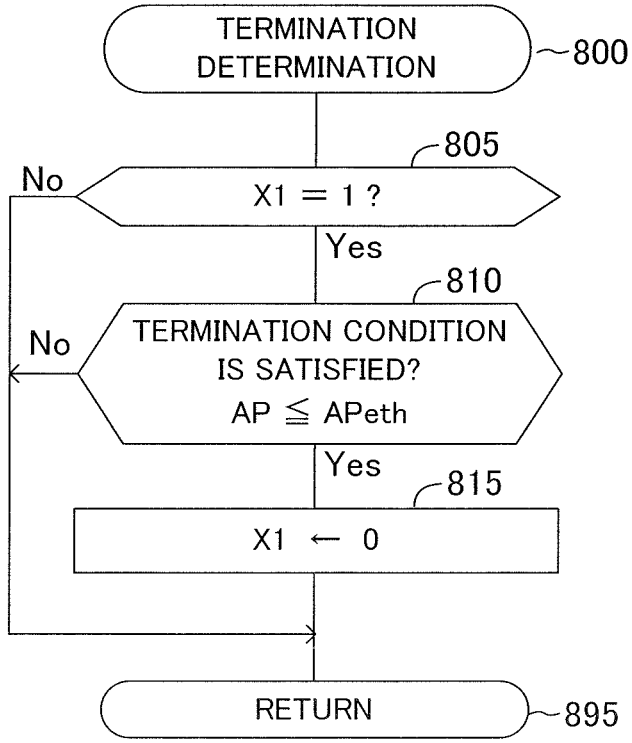
FIG. 8 is a flowchart for illustrating a "termination determination routine" to be executed by the CPU of the control ECU in the first apparatus.

Furthermore, when a predetermined timing is reached, the CPU starts the processing from Step 800 of FIG. 8, and proceeds to Step 805 to determine whether or not the value of the execution flag X1 is "1". When the value of the execution flag X1 is not "1", the CPU makes a "No" determination in Step 805, and proceeds directly to Step 895 to temporarily finish this routine.

When the value of the execution flag X1 is "1", the CPU makes a "Yes" determination in Step 805, and proceeds to Step 810 to determine whether or not the above-mentioned termination condition is satisfied. When the termination condition is not satisfied, the CPU makes a "No" determination in Step 810, and proceeds to Step 895 to temporarily finish this routine.

Meanwhile, when the termination condition is satisfied, the CPU makes a "Yes" determination in Step 810, and proceeds to Step 815 to set the value of the execution flag X1 to "0". Therefore, the CPU makes a "Yes" determination in Step 705 in the routine of FIG. 7. The driving force suppression control and the alerting processing are terminated, and the normal driving force control is restarted.

As described above, when the erroneous operation of the accelerator pedal 51 is performed, the accelerator pedal operation amount AP tends to reach the high opening degree region in a relatively short time (within the first time threshold Tath) after the accelerator pedal operation velocity APV becomes large. The first apparatus determines the satisfaction of the first condition and the satisfaction of the second condition in a stepwise manner to thereby determine that the operation of the accelerator pedal 51 by the driver matches the above tendency. The first apparatus can distinguish between the erroneous operation of the accelerator pedal 51 and the intentional operation of the accelerator pedal 51 with high accuracy. Therefore, it is possible to reduce the possibility that the driving force suppression control is executed in a situation in which the driver intentionally operates the accelerator pedal 51 strongly. Further, the first apparatus can accurately determine the erroneous operation of the accelerator pedal 51 to thereby execute the driving force suppression control at an appropriate timing.

Second Embodiment

Next, a vehicle control apparatus (hereinafter referred to as a "second apparatus") according to a second embodiment will be described. The second apparatus differs from the first apparatus in that the first condition includes a condition A2 (operation amount condition) relating to the accelerator pedal operation amount AP in addition to the condition A1 (operation velocity condition). Hereinafter, a difference with the first apparatus will be mainly described.

As illustrated in FIG. 2, when the erroneous operation of the accelerator pedal is performed by the driver, even after at the time point t0 at which the accelerator pedal operation velocity APV becomes high, the accelerator pedal operation velocity APV continues to be higher than a certain value. For example, the accelerator pedal operation velocity APV is high even in a relatively high region APm in the middle opening degree region.

On the other hand, when the accelerator pedal is intentionally operated by the driver, after the time point t0, the accelerator pedal operation velocity APV is slightly decreased. That is, after the accelerator pedal operation velocity APV is rapidly increased and thus reaches the region APm, the accelerator pedal operation velocity APV tends to be decreased. Therefore, when the accelerator pedal is intentionally operated, the possibility that the condition A1 is satisfied in the region APm is low.

In view of the above, the second apparatus determines whether or not the condition A1 of the first condition is satisfied in the region APm in order to distinguish between the erroneous operation of the accelerator pedal 51 and the intentional operation of the accelerator pedal 51 with higher accuracy.

(Operation)

Figure 9:
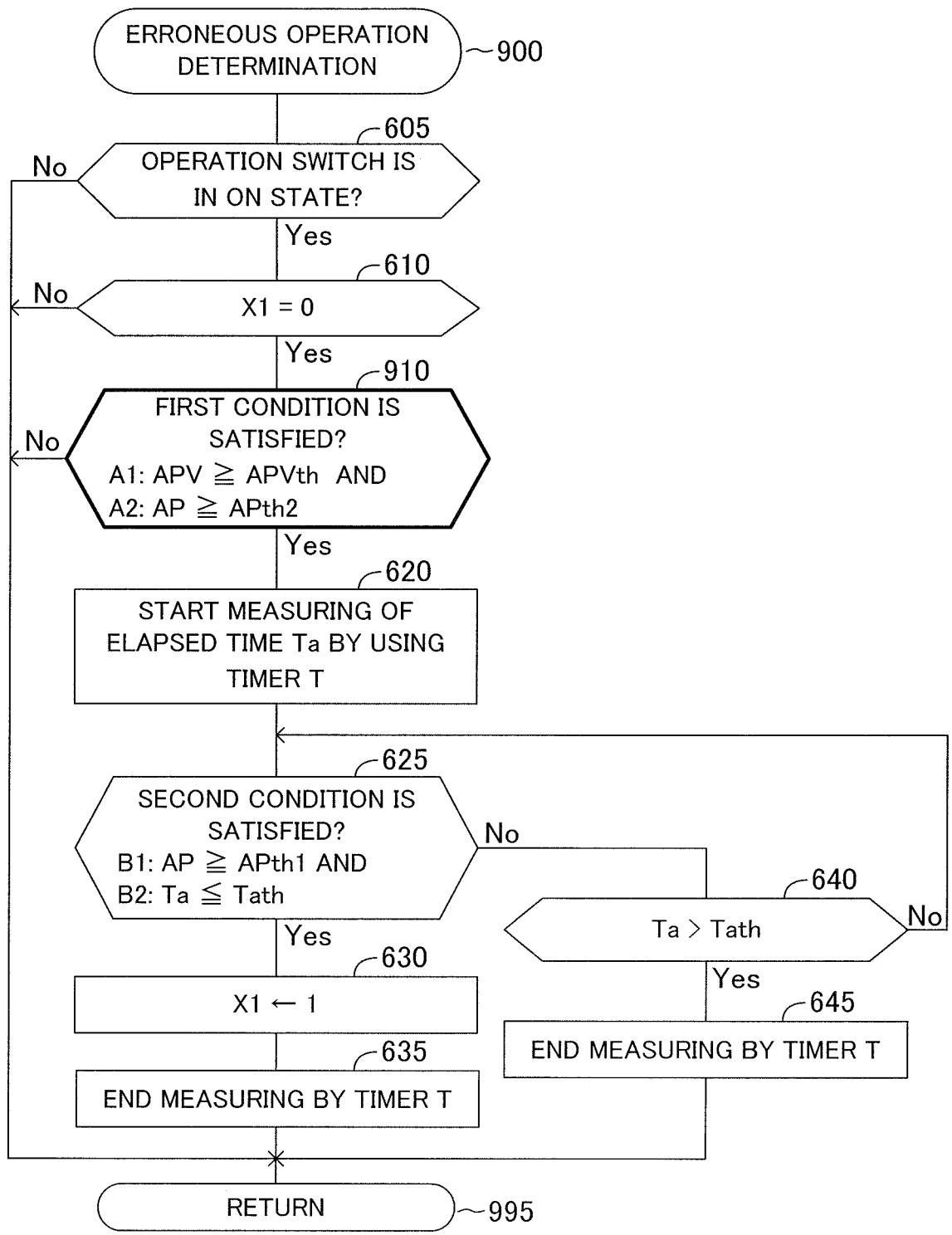
FIG. 9 is a flowchart for illustrating an "erroneous operation determination routine" to be executed by the CPU of the control ECU in a vehicle control apparatus (second apparatus) according to a second embodiment.

The CPU of the control ECU 10 of the second apparatus is configured to execute a routine illustrated in FIG. 9 in place of the routine of FIG. 6. The routine of FIG. 9 is a routine in which Step 615 in the routine of FIG. 6 is replaced with Step 910. In FIG. 9, steps in which the same processing as that in the steps illustrated in FIG. 6 is executed are indicated by the same reference numerals of FIG. 6. Therefore, a detailed description is omitted for those steps.

The CPU starts the processing from Step 900 in the routine of FIG. 9 each time a predetermined time (for example, the first time) elapses. When the operation switch 14 is in the on state and the value of the execution flag X1 is "0", the CPU proceeds to Step 910 to determine whether or not the first condition is satisfied.

Specifically, the CPU determines that the first condition is satisfied when the following conditions A1 and A2 are both satisfied.

(Condition A1): The accelerator pedal operation velocity APV becomes equal to or higher than the operation velocity threshold APVth.

(Condition A2): The accelerator pedal operation amount AP is equal to or larger than a predetermined positive second operation amount threshold APth2. The second operation amount threshold APth2 is smaller than the first operation amount threshold APth1, and larger than the termination threshold APeth. In one or more embodiments, the second operation amount threshold APth2 is equal to or greater than 50[%], and less than 80[%]. In one or more embodiments, the second operation amount threshold APth2 may be a value equal to or greater than 70[%], and less than 80[%]. In the present example, the second operation amount threshold APth2 is 70[%]. In one or more embodiments, the condition A2 may be a condition satisfied when the accelerator pedal operation amount AP is equal to or larger than the second operation amount threshold APth2, and smaller than the first operation amount threshold APth1.

When the first condition is not satisfied, the CPU makes a "No" determination in Step 910, and proceeds directly to Step 995 to temporarily finish this routine.

Meanwhile, when the first condition is satisfied, the CPU makes a "Yes" determination in Step 910, and executes the processing in appropriate steps from among Steps 620 to 645. Thereafter, the CPU proceeds to Step 995 to temporarily finish this routine.

As described above, the second apparatus determines whether or not the condition A1 on the accelerator pedal operation velocity APV is satisfied in the relatively high region in the middle opening degree region (that is, the region in which the accelerator pedal operation amount AP is equal to or larger than the second operation amount threshold APth2, and smaller than the first operation amount threshold APth1). In other words, the second apparatus determines whether the accelerator pedal operation amount AP is equal to or larger than the second operation amount threshold APth2 at the time point at which the condition A1 is satisfied. Therefore, the second apparatus can distinguish between the erroneous operation of the accelerator pedal 51 and the intentional operation of the accelerator pedal 51 with higher accuracy.

Third Embodiment

Next, a vehicle control apparatus (hereinafter referred to as a "third apparatus") according to a third embodiment will be described. The third apparatus differs from the first apparatus in that the erroneous operation condition includes third to seventh conditions described later in addition to the first condition and the second condition. Hereinafter, a difference with the first apparatus will be mainly described.

(Third Condition)

In a situation in which the driver does not operate the brake pedal 52 for a long period of time, there is a possibility that the driver is not able to accurately distinguish between the accelerator pedal 51 and the brake pedal 52. That is, when the first condition and the second condition are satisfied in a situation in which an "elapsed time since the driver releases his/her foot from the brake pedal 52" is long, there is a high possibility that the erroneous operation of the accelerator pedal 51 has been performed.

In view of the above, when the first condition and the second condition are satisfied, the control ECU 10 determines whether or not the following third condition is satisfied based on the signal from the brake switch 32.

(Third condition): An elapsed time Tb since the control ECU 10 receives the off signal from the brake switch 32 is equal to or longer than a predetermined second time threshold Tbth. The elapsed time Tb is a period during which the off signal of the brake switch 32 continues from a time point at which the signal from the brake switch 32 is changed from the on signal to the off signal. In other words, the elapsed time Tb is a period during which a state where the driver does not operate the brake pedal 52 continues from a time point at which the driver releases his/her foot from the brake pedal 52.

In addition, the control ECU 10 sets the value of the elapsed time Tb to zero when the control ECU 10 receives the on signal from the brake switch 32. Then, the control ECU 10 starts measurement of the elapsed time Tb from a time point at which the control ECU 10 receives the off signal from the brake switch 32.

(Fourth Condition)

When the turn signal 61*r* or 61*l* is in the on state, this situation may be the following situation 1 or 2.

(Situation 1): The vehicle VA is rapidly accelerated to overtake a preceding vehicle.

(Situation 2): The vehicle VA is stopped temporarily before a curve, and then, is rapidly accelerated.

In the above situation 1 or 2, the driver intentionally operates the accelerator pedal 51 strongly. On the other hand, when the first condition and the second condition are satisfied in a state in which both of the left and right turn signals 61*l* and 61*r* are in the off state, there is a high possibility that the driver has performed the erroneous operation of the accelerator pedal 51.

In view of the above, when the first condition and the second condition are satisfied, the control ECU 10 determines whether or not the following fourth condition is satisfied based on the signal from the turn signal switch 13.

(Fourth Condition): Both of the left and right turn signals 61l and 61r are in the off state.

(Fifth Condition)

Hereinafter, a state in which one of the left and right turn signals 61l and 61r is in the on state is referred to as a "first state", and a state in which the left and right turn signals 61l and 61r are both in the off state is referred to as a "second state". Immediately after a time point (hereinafter simply referred to as "off time point") at which the state of the left and right turn signals 61l and 61r is changed from the first state to the second state, there is a high possibility that the vehicle VA is still overtaking a preceding vehicle or the vehicle VA is still traveling on a curve. In such a situation, the driver intentionally operates the accelerator pedal 51 strongly. On the other hand, when the first condition and the second condition are satisfied in a situation in which a long time has elapsed since the off time point, there is a high possibility that the erroneous operation of the accelerator pedal 51 has been performed.

In view of the above, when the first condition and the second condition are satisfied, the control ECU 10 determines whether or not the following fifth condition is satisfied based on the signal from the turn signal switch 13.

(Fifth Condition): An elapsed time Tc since the "off time point" is equal to or longer than a predetermined third time threshold Tcth. The elapsed time Tc refers to a period during which the second state of the left and right turn signals 61l and 61r is maintained from the off time point.

In addition, the control ECU 10 sets the value of the elapsed time Tc to zero when the control ECU 10 receives from the turn signal switch 13 the signal indicating that one of the left and right turn signals 61l and 61r is in the on state. Then, the control ECU 10 starts measurement of the elapsed time Tc from a time point at which the control ECU 10 receives from the turn signal switch 13 the signal indicating that the left and right turn signals 61l and 61r are both in the off state.

(Sixth Condition)

The inventors have obtained from the past data of the erroneous operation of the accelerator pedal the following knowledge that there is a high possibility that the erroneous operation of the accelerator pedal 51 is performed in a situation in which the vehicle is traveling at a low speed. In view of the above, when the first condition and the second condition are satisfied, the control ECU 10 determines whether or not the following sixth condition is satisfied.

(Sixth Condition): The vehicle speed Vs is equal to or lower than a predetermined vehicle speed threshold Vth. In one or more embodiments, the vehicle speed threshold Vth is a value equal to or lower than 30 [km/s]. In the present example, the vehicle speed threshold Vth is 30 [km/s].

(Seventh Condition)

In a situation in which a road on which the vehicle VA is traveling is an upslope road, the driver is likely to operate the accelerator pedal 51 strongly in order to prevent the vehicle from moving backward at the time of starting. In other words, when the first condition and the second condition are satisfied in a situation where a road on which the vehicle VA is traveling is not an upslope road, there is a high possibility that the erroneous operation of the accelerator pedal 51 has been performed. In view of the above, when the first condition and the second condition are satisfied, the control ECU 10 determines whether or not the following seventh condition is satisfied based on the signal from the gradient sensor 12.

(Seventh condition): The gradient Gr is equal to or smaller than a predetermined positive gradient threshold Grth.

(Operation)

Figure 10:
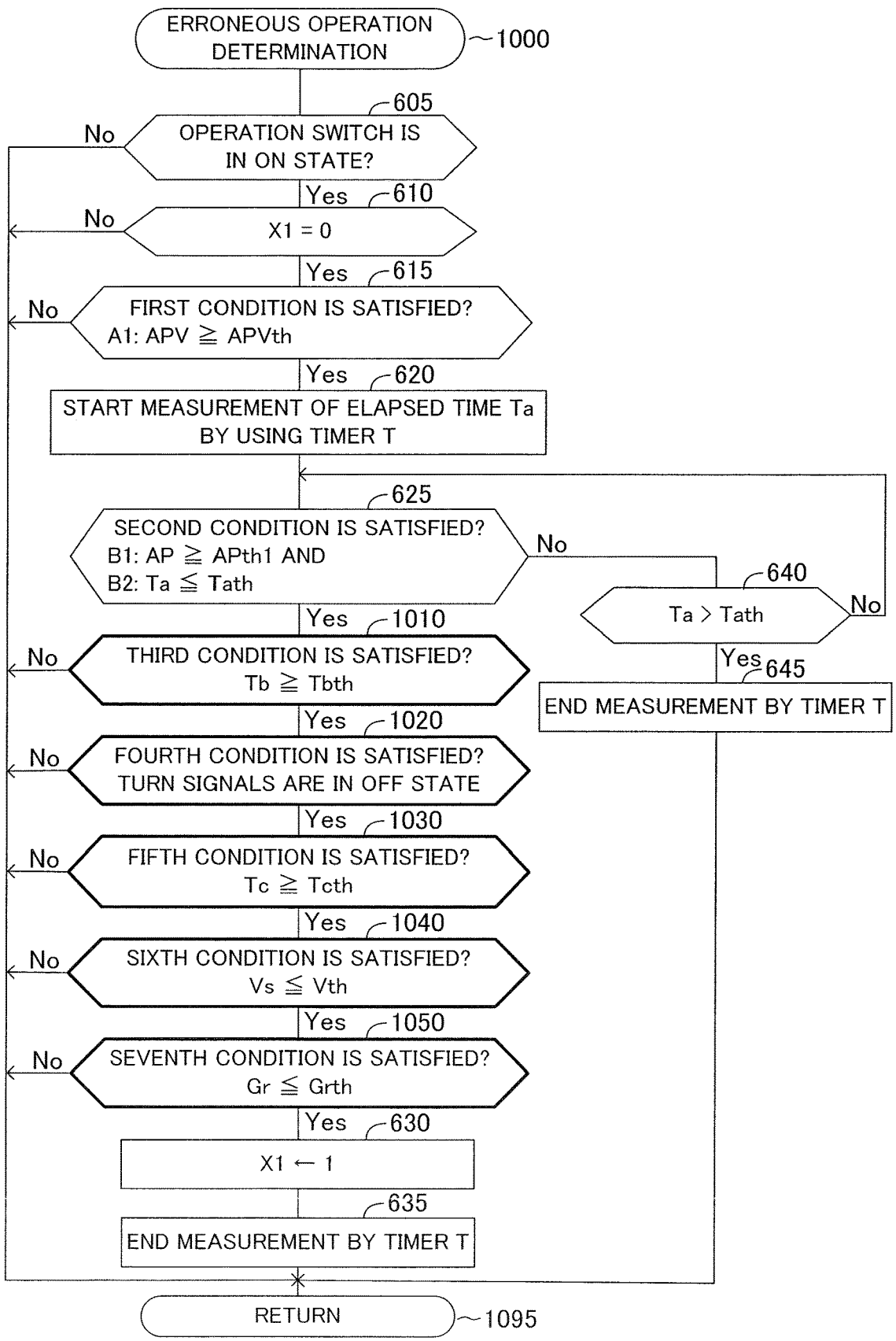
FIG. 10 is a flowchart for illustrating an "erroneous operation determination routine" to be executed by the CPU of the control ECU in a vehicle control apparatus (third apparatus) according to a third embodiment.

The CPU of the control ECU 10 of the third apparatus is configured to execute a routine illustrated in FIG. 10 in place of the routine of FIG. 6. The routine of FIG. 10 is a routine in which Steps 1010 to 1050 are added to the routine of FIG. 6. In FIG. 10, steps in which the same processing as that in the steps illustrated in FIG. 6 is executed are indicated by the same reference numerals of FIG. 6. Therefore, a detailed description is omitted for those steps.

The CPU starts the processing from Step 1000 in the routine of FIG. 10 each time a predetermined time (for example, the first time) elapses. When the CPU determines that the second condition is satisfied in Step 625, the CPU proceeds to Step 1010 to determine whether or not the above-mentioned third condition is satisfied.

When the third condition is not satisfied, the CPU makes a "No" determination in Step 1010, and proceeds directly to Step 1095 to temporarily finish this routine. Meanwhile, when the third condition is satisfied, the CPU makes a "Yes" determination in Step 1010, and proceeds to Step 1020 to determine whether or not the above-mentioned fourth condition is satisfied.

When the fourth condition is not satisfied, the CPU makes a "No" determination in Step 1020, and proceeds directly to Step 1095 to temporarily finish this routine. Meanwhile, when the fourth condition is satisfied, the CPU makes a "Yes" determination in Step 1020, and proceeds to Step 1030 to determine whether or not the above-mentioned fifth condition is satisfied.

When the fifth condition is not satisfied, the CPU makes a "No" determination in Step 1030, and proceeds directly to Step 1095 to temporarily finish this routine. Meanwhile, when the fifth condition is satisfied, the CPU makes a "Yes" determination in Step 1030, and proceeds to Step 1040 to determine whether or not the above-mentioned sixth condition is satisfied.

When the sixth condition is not satisfied, the CPU makes a "No" determination in Step 1040, and proceeds directly to Step 1095 to temporarily finish this routine. Meanwhile, when the sixth condition is satisfied, the CPU makes a "Yes" determination in Step 1040, and proceeds to Step 1050 to determine whether or not the above-mentioned seventh condition is satisfied.

When the seventh condition is not satisfied, the CPU makes a "No" determination in Step 1050, and proceeds directly to Step 1095 to temporarily finish this routine. Meanwhile, when the seventh condition is satisfied, the CPU makes a "Yes" determination in Step 1050, and executes the processing of Steps 630 and 635 as described above. Thereafter, the CPU proceeds to Step 1095 to temporarily finish this routine.

As described above, the erroneous operation condition used in the third apparatus includes the third to seventh conditions in addition to the first and second conditions. Therefore, the third apparatus can determine the erroneous operation of the accelerator pedal 51 with higher accuracy to thereby execute the driving force suppression control at an appropriate timing.

The present disclosure is not limited to the embodiments described above, and various modification examples can be adopted within the scope of the present disclosure.

Modification Example 1

Figure 11:
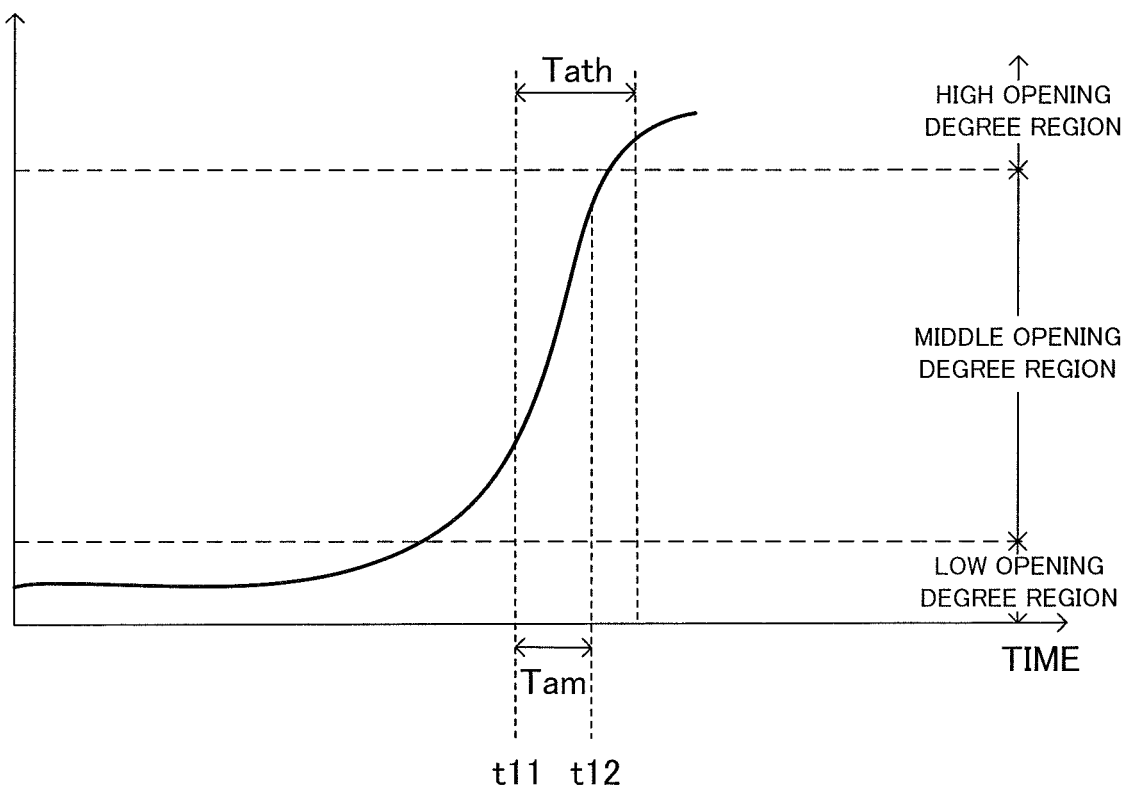
FIG. 11 is a graph for illustrating an example of a change with time of the accelerator pedal operation amount AP when the driver performs the erroneous operation of the accelerator pedal.

The method for determining whether the second condition is satisfied is not limited to the above example. In one or more embodiments, as illustrated in FIG. 11, the control ECU 10 calculates the accelerator pedal operation velocity APV at a time point t12 at which a predetermined time Tam (<Tath) has elapsed since a time point t11 at which the first condition is satisfied. The predetermined time Tam is, for example, a value longer than "Tath/2". The control ECU 10 may determine whether the acceleration pedal operation amount AP will have reached the first operation amount threshold APth1 within the first time threshold Tath from the time point t11 based on "the accelerator pedal operation amount $AP_{t12}$ and accelerator pedal operation velocity $APV_{t12}$ at the time point t12" and "the remaining time (=Tath−Tam)". In this configuration, the control ECU 10 can detect the erroneous operation of the accelerator pedal at an earlier time point (that is, time point t12) to thereby start the driving force suppression control at an earlier timing.

In one or more embodiments, when the following expression (1) is satisfied at the time point t12, the control ECU 10 determines that the accelerator pedal operation amount AP will have reached the first operation amount threshold APth1 within the first time threshold Tath from the time point t11.

$$(APth1-AP_{t12})/(Tath-Tam) < APV_{t12} \quad (1)$$

When the accelerator pedal operation velocity $APV_{t12}$ at the time point t12 is larger than the left side of the expression (1), there is a high possibility that the accelerator pedal operation amount AP will have reached the first operation amount threshold APth1 within the first time threshold Tath from the time point t11. In this manner, the control ECU 10 may monitor the accelerator pedal operation velocity APV, and determine whether the second condition is satisfied at the time point t12 at which the predetermined time Tam has elapsed since the time point t11 at which the first condition is satisfied.

Modification Example 2

In the third embodiment, Step 615 of FIG. 10 may be replaced with Step 910 of FIG. 9.

Modification Example 3

In the third embodiment, the timing for determining whether each of the third to seventh conditions is satisfied is not limited to the timing of the routine in FIG. 10 (that is, after Step 625). The CPU may determine whether each of the third to seventh conditions is satisfied at the timing at which the first condition is satisfied. For example, in the routine of FIG. 10, Steps 1010 to 1050 may be inserted between Steps 615 and 620.

Modification Example 4

In the third embodiment, the erroneous operation condition may not include all of the third to seventh conditions. In one or more embodiment, the erroneous operation condition may include at least one of the third to seventh conditions in addition to the first and second conditions. That is, one or more of Steps 1010 to 1050 may be omitted in FIG. 10.

Modification Example 5

The termination condition in Step 810 is not limited to the above example. The termination condition may be a condition satisfied when the control ECU 10 receives the on signal from the brake switch 32, or the brake pedal operation amount BP becomes a value larger than zero.

Modification Example 6

The accelerator operation element is not limited to the accelerator pedal 51, and may be, for example, an accelerator lever. The decelerator operation element is not limited to the brake pedal 52, and may be, for example, a brake lever.

Modification Example 7

The control ECU 10 may be configured to transmit the target acceleration Gtgt to the brake ECU 30 in Step 715 of FIG. 7. In this configuration, the brake ECU 30 may be configured to, when the actual acceleration Ga exceeds the target acceleration Gtgt, control the brake actuator 33 to apply the braking force to the wheels. According to this configuration, the travel state of the vehicle VA is controlled such that the actual acceleration Ga does not exceed the target acceleration Gtgt.

Modification Example 8

Another sensor may be adopted in place of the gradient sensor 12 configured to calculate the gradient Gr from the acceleration. For example, the vehicle VA may include an inclination angle sensor configured to detect an inclination angle θ of a road on which the vehicle VA travels, in place of the gradient sensor 12. In this configuration, the seventh condition may be a condition satisfied when the inclination angle θ of the road is equal to or smaller than a predetermined positive inclination angle threshold θth.

Modification Example 9

The driving force suppression control is not limited to the above example. In one or more embodiments, when the erroneous operation condition is satisfied, the control ECU 10 is configured to control the driving force of the vehicle VA such that the driving force of the vehicle VA changed according to the accelerator pedal operation amount AP becomes smaller than that of when the erroneous operation condition is not satisfied (that is, when the normal driving force control is executed).

In one or more embodiments, when the erroneous operation condition is satisfied, the control ECU 10 may always set the target acceleration Gtgt to zero.

In one or more embodiments, when the erroneous operation condition is satisfied, the control ECU 10 may calculate the target acceleration Gtgt by multiplying the required acceleration Gap corresponding to the accelerator pedal operation amount AP by a predetermined coefficient (for example, a value less than 1). According to this configuration, the driving force of the vehicle VA when the erroneous operation condition is satisfied becomes smaller than the driving force of when the erroneous operation condition is not satisfied (that is, when the normal driving force control is executed).

What is claimed is:

1. A control apparatus for a vehicle, comprising:
   an accelerator operation element configured to be operated by a driver of the vehicle to accelerate the vehicle;
   a sensor configured to acquire information on at least an operation amount of the accelerator operation element; and a controller configured to
    determine whether or not a predetermined erroneous operation condition is satisfied based on the information acquired by the sensor, and
    when determining that the erroneous operation condition is satisfied, execute driving force suppression control for controlling a driving force of the vehicle such that the driving force changed according to the operation amount of the accelerator operation element becomes smaller than the driving force of when the erroneous operation condition is not satisfied,
wherein the controller is further configured to, when a first condition including at least an operation velocity condition is satisfied and a second condition is satisfied, determine that the erroneous operation condition is satisfied, the operation velocity condition being satisfied when an operation velocity which is an amount of change in the operation amount per unit time is equal to or higher than a predetermined positive operation velocity threshold, and the second condition being satisfied when the operation amount becomes equal to or larger than a predetermined positive first operation amount threshold within a predetermined first time threshold from a time point at which the first condition is satisfied.

2. The control apparatus according to claim 1, wherein the controller is configured to, when an operation amount condition is satisfied in addition to the operation velocity condition, determine that the first condition is satisfied, the operation amount condition being satisfied when the operation amount when the operation velocity condition is satisfied is equal to or larger than a predetermined positive second operation amount threshold which is smaller than the first operation amount threshold.

3. The control apparatus according to claim 1, further comprising a decelerator operation element configured to be operated by the driver to decelerate the vehicle,
    wherein the controller is configured to, when a third condition is satisfied in addition to the first condition and the second condition, determine that the erroneous operation condition is satisfied, the third condition being satisfied when an elapsed time since the driver releases an operation of the decelerator operation element is equal to or longer than a predetermined second time threshold.

4. The control apparatus according to claim 1, wherein the controller is configured to, when a fourth condition is satisfied in addition to the first condition and the second condition, determine that the erroneous operation condition is satisfied, the fourth condition being satisfied when a turn signal of the vehicle is in an off state.

5. The control apparatus according to claim 4, wherein the controller is configured to, when a fifth condition is satisfied in addition to the first condition, the second condition and the fourth condition, determine that the erroneous operation condition is satisfied, the fifth condition being satisfied when an elapsed time since a state of the turn signal is changed from a first state to a second state is equal to or longer a predetermined third time threshold, the first state being a state in which the turn signal is in an on state, and the second state being a state in which the turn signal is in the off state.

6. The control apparatus according to claim 1, wherein the controller is configured to, when a sixth condition is satisfied in addition to the first condition and the second condition, determine that the erroneous operation condition is satisfied, the sixth condition being satisfied when a speed of the vehicle is equal to or lower than a predetermined speed threshold.

7. The control apparatus according to claim 1, wherein the controller is configured to, when a seventh condition is satisfied in addition to the first condition and the second condition, determine that the erroneous operation condition is satisfied, the seventh condition being satisfied when a gradient of a road on which the vehicle travels is equal toor smaller than a predetermined gradient threshold.

8. The control apparatus according to claim 1, wherein the controller is configured to, when a termination condition is satisfied after the erroneous operation condition is satisfied, terminate the driving force suppression control, the termination condition being satisfied when the operation amount of the accelerator operation element is equal to or smaller than a predetermined third operation amount threshold which is smaller than the first operation amount threshold.

9. A control method for a vehicle including an accelerator operation element configured to be operated by a driver of the vehicle to accelerate the vehicle, and a sensor configured to acquire information on at least an operation amount of the accelerator operation element, the control method comprising:
    determining whether or not a predetermined erroneous operation condition is satisfied based on the information acquired by the sensor; and
    when determining that the erroneous operation condition is satisfied, executing driving force suppression control for controlling a driving force of the vehicle such that the driving force changed according to the operation amount of the accelerator operation element becomes smaller than the driving force of when the erroneous operation condition is not satisfied,
    wherein the determining includes determining that the erroneous operation condition is satisfied when a first condition including at least an operation velocity condition is satisfied and a second condition is satisfied, the operation velocity condition being satisfied when an operation velocity which is an amount of change in the operation amount per unit time is equal to or higher than a predetermined positive operation velocity threshold, and the second condition being satisfied when the operation amount becomes equal to or larger than a predetermined positive first operation amount threshold within a predetermined first time threshold from a time point at which the first condition is satisfied.

* * * * *